April 26, 1927.

H. E. BRYANT 1,626,265

LINEAR MEASURING MACHINE

Filed Oct. 16, 1925

Inventor:
Henry E. Bryant,
by Wright, Brown, Quinby & May
attys.

Patented Apr. 26, 1927.

1,626,265

UNITED STATES PATENT OFFICE.

HENRY E. BRYANT, OF PROVIDENCE, RHODE ISLAND, ASSIGNOR TO TUBULAR WOVEN FABRIC COMPANY, OF PAWTUCKET, RHODE ISLAND, A CORPORATION OF RHODE ISLAND.

LINEAR-MEASURING MACHINE.

Application filed October 16, 1925. Serial No. 62,761.

The present invention relates to machines for measuring by contact the length of elongated slender articles such as tubing rope, cable, wire, rods, bars, and the like. The machine is one of the type employing a wheel or drum designed to roll in contact with the surface of the elongated article and thus to measure the length of the latter by actuating a counter or indicator, the indications of which are calibrated in proportion to the circumference of the measuring wheel.

Machines of this character are very inaccurate and unreliable for the purpose of measuring such articles of the general nature above indicated as are smooth on the surface and have a small coefficient of friction, and are otherwise of such a nature that they cannot be wrapped or carried about the periphery of the measuring wheel or drum far enough to overcome the difficulties due to the low coefficient of friction. When the friction between the measuring wheel and the article being measured is too small, more or less slip occurs, and the amount of slip is indeterminate, so that the peripheral travel of the measuring wheel does not conform in any ascertainable ratio to the length of the article traveling past it, and the indications given are therefore inaccurate.

My invention has for its object to obtain sufficient friction between elongated articles of the character above indicated and a measuring wheel to secure accurate and dependable results in circumstances where the traction of a single tangent contact is insufficient for the purpose, and it is not possible to secure increased traction by bending or wrapping the article around a considerable proportion of the surface of the measuring wheel. This object is accomplished by providing the measuring wheel with surfaces which embrace the article to be measured and apply pressure to the opposite sides thereof.

The drawings provided with this specification show a machine embodying the principles of this invention in the form now preferred by me, together with one of the possible modified constructions of the measuring wheel, and in such drawings, Fig. 1 is a side elevation of such machine;
Fig. 2 is an end elevation as seen from the right of Fig. 1, the measuring wheel being broken away and shown in section;
Fig. 3 is a plan view of the machine; and
Fig. 4 is a partial section and partial elevation of a different form of measuring wheel.

Like reference characters designate the same parts wherever they occur in all the figures.

In a structure comprised by two side frames 11 and 12, there is mounted rotatably a shaft 13 on which the measuring wheel 14 is secured. A table 15 is suitably secured to the frames so as to support and guide the material or article 16 being measured. The supporting surface of the table 15 is tangent to the circumference of the measuring wheel, and there is a slot 17 in the table of suitable dimensions to receive the upper part of the wheel. Guides 18, 18 and 19, 19 are mounted on the upper side of the table to locate and guide the article being measured in the proper path.

The measuring wheel is provided with two radially extending flanges 20 and 21, one of which is movable toward and away from the other to admit articles of differing widths, and is pressed toward said other flange with spring pressure so as to grip the inserted article. Both flanges may be so movable toward one another, but it is sufficient and preferable to make one of them, as the flange 20, integral with the wheel and to make the other one movable, forming the latter flange 21 upon a ring 22 fitted closely but movably on the measuring wheel. Said ring 22 is formed with an inwardly extending flange or lug 23, offset from the plane of the flange 21, through which pass studs 24, which are set into the measuring wheel and are parallel with the axis thereof, and between the heads of which and the flange or lugs 23 are springs 25 exerting pressure on the ring to force it toward the opposed flange 20. Said bolt heads form abutments against which the springs react, and in effect are parts of the wheel body and flange 20. I have also shown set screws 26 mounted in the flange 23 and bearing against the adjacent end of the measuring wheel so as to limit the pressure applied by the ring to the article being measured.

A hold-down wheel 27 is mounted over the course of the article being measured on a shaft 28, which turns in bearing boxes 29, the latter being confined in guideways in the frames and being pressed upon by springs 30, as shown in Fig. 1. The hold-down wheel assures that the measured article will remain and travel in contact with the periphery of the measuring wheel, with a certain amount of pressure, and prevents any effect of lifting or canting the measured article away from such periphery by the flanges at the rising side of the measuring wheel.

I have shown also a counter or measuring indicator represented as a pointer 31 traveling over a dial 32 and driven by the shaft 13 through suitable gearing, here typified by a worm 33 on the shaft and a worm wheel 34 connected to the pointer. Such indicator and its driving means are illustrative or typical of means for showing the lengths measured by the measuring wheel. Other means or mechanisms than that here shown may be used for the same purpose without departing from the invention which I claim, and within the scope of permissible equivalents.

The virtue and advantage of this machine consists in the fact that the article to be measured is engaged with it not merely at a single tangent point on its cylindrical periphery, but is embraced and pressed upon from both sides by plane surfaced flanges having an extended length of contact bearing. Even in the case of materials of which the coefficient of friction is low, the flanges cause so great friction between the material and the measuring wheel, and obtain such great traction, that the wheel is rotated in an invariable ratio to the speed of travel of the article being measured. Of course slip occurs between the flanges of the wheel and the article, due to the fact that the flanges travel in a curved path, while the article travels in a straight line, and to the fact also that the points where the flanges engage the article are more remote from the axis of the wheel than the tangent point between the article and the circumference of the wheel. But the traction between the article and the wheel is so great that no appreciable variation between the rate of travel of the article and the rate of rotation of the wheel occurs, wherefore, since the indicator is calibrated to measure and indicate the linear travel of that part of the wheel which travels at the same speed as the article, the indications given are free from sensible error and are reliable.

The scope in which I claim protection is not limited by the nature of the articles or goods to be measured by this machine. It is adapted for measuring such goods as flexible conduit made of strip metal, coiled into a tube, or electrical cable armored with similar material, or for measuring wire, rods, etc., but it is not restricted to use with material having a low coefficient of friction only, or to the exclusion of materials which can be satisfactorily measured by other types of machines.

It will be noted that the periphery of the wheel or disk 14, the flanges 20 and 21, and the holding-down wheel 27, are disposed so as to make contact with tubing or any other article of the kind herein contemplated, at four points equally distributed about the axis of the article; that is, the article is engaged at opposite ends of two diameters, which are at right angles to each other. Thus, although a sensible pressure is exerted between the circumference of the disk and the holding-down wheel, and also between the flanges 20 and 21, flattening or collapsing of the article between the members of either of these pairs of complemental pressure elements, is prevented by the resistance opposed by the members of the other pair to spreading laterally and at right angles to the direction of the compressive pressure exerted by those of the first pair. It follows then that, not only is the article adequately gripped and held, but it is also supported and reenforced against collapsing. Hence the machine is admirably adapted for measuring highly flexible or very delicate tubing, such as the woven tubing used for electrical conduit, thin-walled copper tubing, and other more or less similar delicate structures, as well as those which are rugged but need surface contact simultaneously at a number of points to provide sufficient traction. By virtue of this construction, sufficient traction may be applied by flimsy and delicate, or otherwise easily compressible structures, for the purpose of driving the measuring wheel, but without danger of collapsing, flattening or otherwise distorting such structures; for a tube confined against widening in one direction, is strongly resistant to flattening in a direction at right angles to the first direction.

In order to avoid leaving any space, however small, between the circumference of the wheel and either of its flanges, I have designed the form of wheel shown in Fig. 4, in which the flanges are formed by the outer portions of two discs or circular plates 20$^a$ and 21$^a$, and the circumference, or supporting part of the wheel, which holds the measured article at a given distance from the center, is formed by pins 35 secured alternately in the two discs and projecting slidably through holes in the other disc. The discs are thus adapted to approach and recede from one another, and the disc 21$^a$ is actuated to that effect by means of the same character as already described. The salient distinguishing characteristic of this form of wheel is that the supported surface for the article measured is formed of overlapping elements which alternately are, in effect, unitary parts of the two flanges. The construction of such supporting surface out of pins is merely one possible mode of making it.

In calling the measuring element of this machine a wheel, I have not intended to indicate a limitation of the invention, but have intended rather to include within the meaning of the term "wheel" any rotatable structure capable of coacting in essentially the manner indicated with the elongated slender article to be measured.

What I claim and desire to secure by Letters Patent is:

1. A linear measuring apparatus comprising a rotatable wheel or disc having means surrounding its axis at a uniform distance from such axis for engagement with the article to be measured, said wheel also having complemental means arranged to grip the sides of the article, which complemental means are adjustable relatively toward and away from one another to accommodate articles of different widths, and means coupled with said wheel for indicating the travel thereof.

2. A machine for measuring the length of endwise traveling goods of slender elongated nature, comprising a guide constructed to establish the path in which such goods are constrained to travel, a wheel having an outstanding rim crossing the plane of said guide beside said path, and gripping means carried by said wheel complemental to said rim at the opposite side of such path from the rim and also crossing the plane of said guide.

3. A machine for measuring elongated slender articles, comprising guiding means for establishing the path of the article to be measured, a measuring wheel having separable and adjustable flanges embracing such path and adapted to embrace said article between them and grip the article, and means for indicating the extent of linear travel of that part of the disc which travels at the same speed as the article being measured.

4. A measuring apparatus comprising a measuring wheel having flanges side by side, one of which is movable toward and away from the other, yielding means arranged to exert pressure upon one of said flanges to force it toward the other, and distance indicating means coupled to said wheel for operation synchronously therewith.

5. A measuring apparatus comprising a wheel having separable flanges lying in planes substantially perpendicular to the axis of the wheel and having also a circumferential structure within the circumference of said flanges arranged to limit penetration between the flanges of the article to be measured, and yielding force-applying means mounted and arranged to act on said flanges and tending to move them toward one another.

6. A measuring machine for measuring the length of elongated slender articles comprising a wheel having flanges arranged in substantially parallel planes perpendicular to the axis of the wheel, one of which flanges is movable toward and away from the other, yielding pressure applying means arranged to exert force on said movable flange tending to cause its approach toward the opposite flange, and guiding means arranged to lead the article being measured in a path passing between said flanges near the rims thereof.

7. A measuring machine for measuring the length of elongated slender articles comprising a wheel having flanges arranged in substantially parallel planes perpendicular to the axis of the wheel, one of which flanges is movable toward and away from the other, yielding pressure applying means arranged to exert force on said movable flange tending to cause its approach toward the opposite flange, guiding means arranged to lead the article being measured in a path passing between said flanges near the rims thereof, and distance indicating means driven by said wheel.

8. A linear measuring apparatus comprising a wheel having flanges and an intermediate structure between said flanges and between their circumference and the axis of the wheel, arranged to provide an inner limit to the space bounded by the flanges; said flanges being constructed with provision for relative movement together and apart.

9. A linear measuring apparatus comprising a wheel having flanges and an intermediate structure between said flanges and between their circumference and the axis of the wheel, arranged to provide an inner limit to the space bounded by the flanges; said flanges being constructed with provision for relative movement together and apart, and springs acting and reacting on and between said flanges with tendency to force them together.

10. A linear measuring device comprising a wheel having two radially extending flanges one of which is movable toward and away from the other, spring abutments connected to one of said flanges, and springs reacting between said abutments and the other flange with tendency to force one of the flanges toward the other.

In testimony whereof I have affixed my signature.

HENRY E. BRYANT.